(No Model.) 2 Sheets—Sheet 1.
I. METZGER.
JOURNAL BOX.
No. 511,445. Patented Dec. 26, 1893.
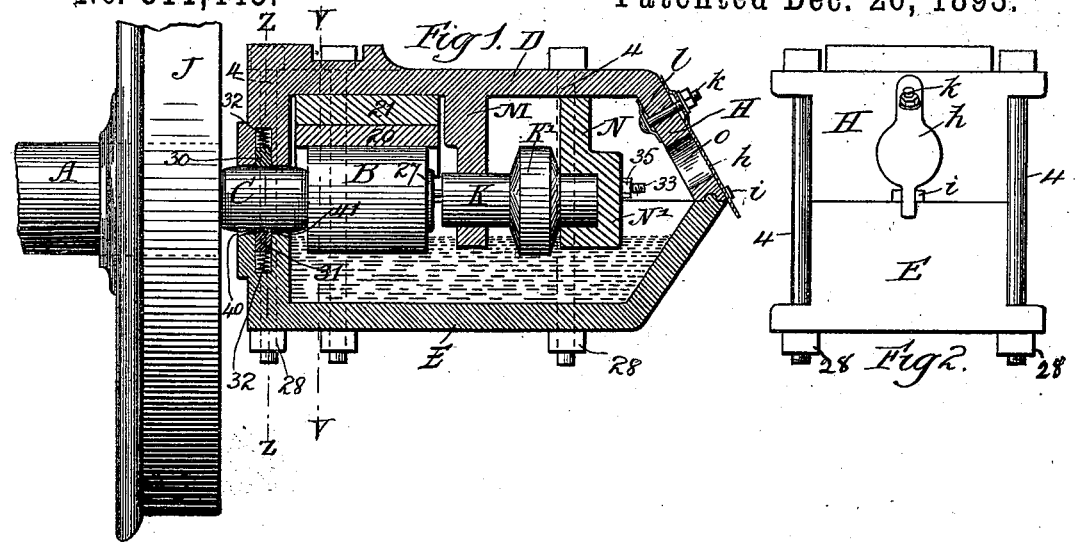
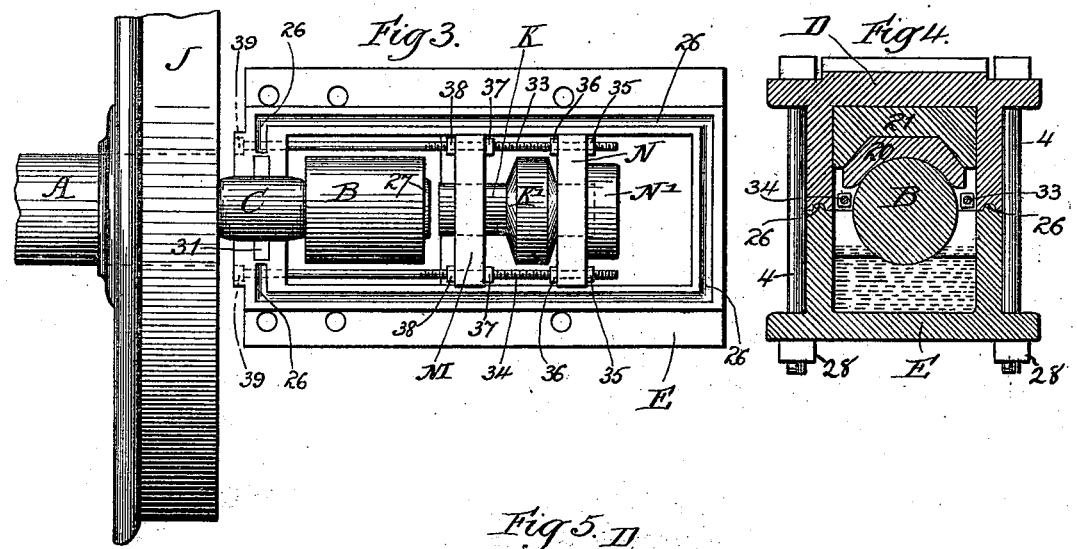
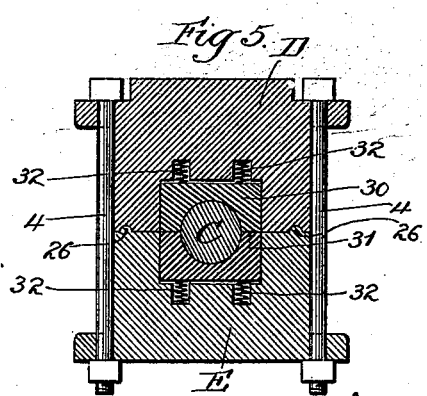
Witnesses.
Wm. M. Rheem
Wm. F. Henning
Inventor.
Isbon Metzger
by Denton J. Hall
Atty.
THE NATIONAL LITHOGRAPHING COMPANY,
WASHINGTON, D. C.

(No Model.) 2 Sheets—Sheet 2.
I. METZGER.
JOURNAL BOX.
No. 511,445. Patented Dec. 26, 1893.
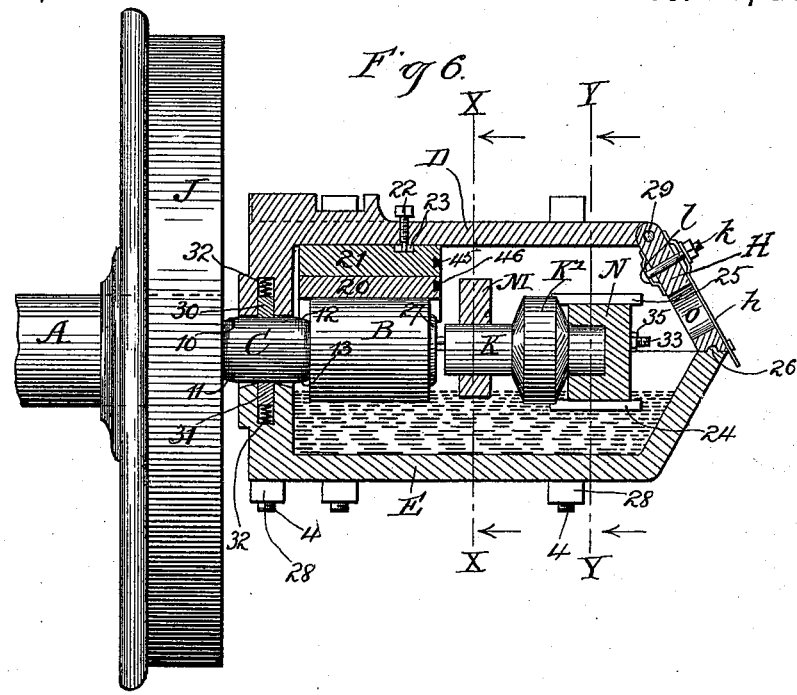
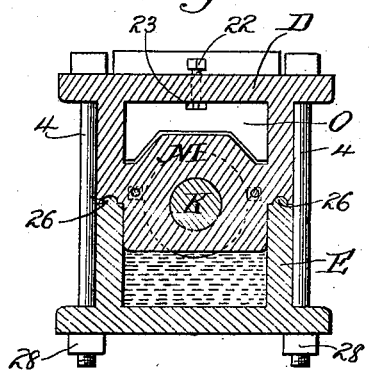
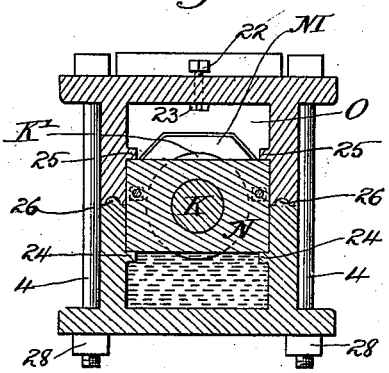
Witnesses
Wm. M. Rheem
Wm. F. Henning
Inventor
Ibon Metzger
by Benton J. Hall
Atty.

UNITED STATES PATENT OFFICE.

ISBON METZGER, OF WINFIELD, IOWA.

JOURNAL-BOX.

SPECIFICATION forming part of Letters Patent No. 511,445, dated December 26, 1893.

Application filed September 4, 1893. Serial No. 484,717. (No model.)

*To all whom it may concern:*

Be it known that I, ISBON METZGER, a citizen of the United States, residing at Winfield, in the county of Henry and State of Iowa, have invented new and useful Improvements in Journals and the Boxing Therefor of Railroad-Axles, of which the following is a specification.

My invention relates to improvements in journals and the boxing therefor of railroad axles, and similar kinds of machinery.

Its objects are to provide a journal of peculiar construction and the appropriate bearing or boxing of peculiar construction to prevent the admission therein of dust or sand, and to provide automatic lubrication without the employment of wicking or other packing material to absorb the lubricating material and hold it against the revolving parts; whereby the expense, waste and loss rendered necessary by the employment of such material are obviated. I attain these objects by means of the mechanism shown and illustrated by the accompanying drawings, in which like reference letters and numerals refer to like parts throughout.

Figure 1 represents a longitudinal, vertical, sectional view of my improved box with the journal B and bolt K shown in perspective. Fig. 2 represents the external end view of my car box. Fig. 3 represents a top plan view of the lower section of my car box with the journal and bolt K in perspective. Fig. 4 represents a cross section of my invention upon the line V V, Fig. 1. Fig. 5 represents a cross sectional view of my invention upon the line Z Z, Fig. 1. Fig. 6 represents a longitudinal, vertical, sectional view of another form of my invention with the journal B and the bolt K shown in perspective. Fig. 7 is a cross sectional view of my invention upon the line X X, Fig. 6. Fig. 8 is a cross sectional view of my invention upon the line Y Y, Fig. 6.

Letter D represents the upper section of my car box. Letter E represents the lower section thereof.

Letters A, B and C represent the axle and journal which are supported in the car box, letter B representing an enlargement of the axle C, and it is preferably provided with a slight extension, 27. The diameter of the axle C is less than that of the journal B, and the diameter of the main axle A is slightly greater than that of the journal B, in order that the wheel J may be passed over the journal B and rigidly affixed to the axle A. The bore or opening of the car box in which that portion of the axle C plays, is slightly greater in diameter than that of the axle C, and in its lower wall the bore is beveled both inwardly and outwardly, as shown by numerals 40 and 41, Fig. 1. The object of this beveling in the lower portion of the bore of the boxing, is to prevent grit and sand from entering from without, and to prevent any of the lubricating material within the boxing from passing outwardly. Within the boxing and constituting a bearing for the journal B, are located the ordinary block 21, and the brass 20, which bear upon that journal. The block and brass are slightly narrower than the space in which they are located, in order that they may have a certain degree of lateral play corresponding to the lateral movement of the journal B.

In Fig. 1 I have shown the permanent bridge M made integral with the upper section of the boxing D which abuts and limits the play of the block 21 and the brass 20. In Fig. 3, I have shown this bridge M integral with the lower section of the boxing, and so constructed as to extend up into the upper section D. In both these forms where the bridge M is made solid without any opening for the removal of block 21 and brass 20, the latter could only be removed and taken out by separating and opening the upper and lower sections of the boxing. In Figs. 6, 7 and 8, I have shown the permanent bridge M made integral with the upper section of the boxing and extending downward into the lower section E, but an opening or space O is cut out in the permanent bridge by means of which the block 21 and the brass 20 can be removed and taken out through the door H of the box without separating and opening the two sections of the box. It is evident that as shown in Figs. 1 and 2, the movement or play of the block 21 and brass 20 are limited by the interior wall of the boxing and the permanent bridge M. But in the form of the permanent bridge M shown in Figs. 6, 7 and 8, where the space O is provided, other means are required to limit the lateral play of the block 21 and brass 20, and more especially block 21. This is accomplished by cutting in the upper surface of block 21, the longitudinal slot 23, and introducing into it through the top section D of the box, the screw threaded bolt 22 which engages in the said longitudinal block and limits its play. In the permanent bridge M is cut a bearing to receive and carry freely the bolt K, upon which is located an enlarged collar or ring K', whose diameter preferably corresponds with the diameter of the journal B. Letter N represents a sliding bridge located in the interior of the car box and held in place by the extensions or guides 24 and 25 located upon the opposite interior walls of the two sections of the boxing. This sliding bridge N is provided with a takeup or bearing N', which receives and carries the outward end of the bolt K. The two sections D and E are provided respectively with a tongue and groove 26 which closely fit into each other, and tend to hold the two sections rigidly together, and also to prevent any lubricating material from escaping through the union of the two sections. The interior walls of the two sections D and E are provided with slots which carry the packing 30 and 31, from which segments are cut out so as to fit closely the axle C and prevent the introduction of grit or dust into the boxing or the escape of lubricating material therefrom. These pieces of packing are held closely to the axle and to each other by the springs 32, as shown. The two sections, D and E, when properly adjusted, are held together by the usual screw threaded bolts 4 and nuts 28 which may pass through openings in flanges located along the sides of said sections or through lugs made integral therewith.

In Fig. 1 I have shown an opening (o) for the introduction of the lubricating fluid which is covered by a cap (h) pivoted by a bolt (k). The cap or cover (h) is bent slightly where the bolt or pivot (k) passes through it, and possesses more or less resiliency which holds it closely to the outer surface of the boxing. Its lower extension engages with a catch (i) from which it may be lifted and disengaged and thrown around in either direction so as to uncover the opening (o). Where this construction is employed, as already stated and as shown in Fig. 1, the block 21 and brass 20 can only be removed by separating the two sections of the boxing, but in Fig. 6, I have shown a modified form of the door or opening H, hinged to the upper portion of the section D at the point 29. The form of door is not a part of my invention, and any form of door, including its method of hinging and fastening, may be employed provided that when open it leaves sufficient space to permit the withdrawal of the block 21 and brass 20. I prefer to have holes drilled in the ends of the block 21 and brass 20 so that they may be seized upon by a hook inserted through the door and drawn out.

One of the important features of my invention consists in providing an abutment or limit to the lateral play of the journal in the box and to prevent the wheel of the car impinging on the box and wearing it. I accomplish this by introducing the bolt K held in a bearing in the permanent bridge M. It is evident that when the lateral movement of the journal in the boxing brings the end of the journal or its extension 27 in contact with the end of the bolt K, it will cause the bolt K to revolve in its bearing in the permanent bridge M and in the sliding bridge N. This will prevent any undue wear upon either the end of the journal or the end of the bolt K. The enlargement or collar K' is preferably beveled upon each side so that the lubricating material will flow down upon the body of bolt K in both directions and lubricate its bearings in the permanent bridge M and sliding bridge N. The distance between the end of the bolt K and the end of the journal B is regulated by the rods 33, which are screw threaded as shown, and the nuts 35, 36, 37, 38 and 39, the rods extending entirely through the front or interior wall of the boxing, as shown. There will necessarily be more or less wear upon the end of the journal B and that of the bolt K, so that the distance between the two must be adjusted from time to time. This is accomplished as already intimated by the rods 33 and the several nuts just specified. By this means the bolt K is held firmly in position and operates as a limit to the lateral play of the journal B in the boxing.

In the proper application of my improved boxing to the axle of cars they should be so located with reference to the width of the car and the length of the axle that in the lateral play of the journal B, they will impinge upon the end of the bolt K in either direction laterally, before the car wheel J can come in contact with the interior end of the boxing and abrade it. By such a construction the only wear and tear, so far as the lateral play of the axle is concerned, is upon the ends of the journals B and the bolts K, and this, as already explained, can be compensated by means of the permanent and adjustable bridges M and N, respectively. The object of providing an enlarged flange or collar B and bearing of the axle, is that it may extend sufficiently far down into the lower section of the boxing to meet the lubricating material placed therein. The same is true of the enlargement or ring K' of the bolt K. The lubricating material is introduced through the door H or the small, opening O', but care must always be taken not to fill the lower section with the lubricating material until it rises up to or above the bore in which the axle C is located, for in that event more or less of the lubricating material would escape through that bore. In case the bridge M is made integral with the lower section E of the boxing, a space must be left beneath it to permit the lubricating material to pass through and fill the chamber beneath the journal B.

Having thus described my invention and its construction, it is evident that its mode of operation is very simple. The upper section provided with the block 21 and brass 20 are located in their appropriate place and become the bearing proper for the journal B. The bolt K is inserted in its bearings and its relation to the journal B, laterally, is adjusted by means of the sliding or movable bridge N and the rods and nuts hereinbefore described. The two sections of the boxing are then put together and held rigidly in place, and thus constitute a box or boxing. The lubricating material is then introduced in sufficient quantities to arise slightly above the lower periphery of the journal B and the ring K'. It is evident that in the rotation of the axle and the journal, as also that of the bolt K, with its ring K', the lubricating material will be carried around between the journal and its bearing (brass 20), and also into the bearings in the bridges which support and carry the bolt K. It is also further evident that when properly constructed and applied, the boxing is kept free from contact with the wheel, and that the only wear or tear exists between the end of the journal B and the end of the bolt K. It is impossible for the lubricating material to escape from the boxing, and it will remain until slowly and gradually consumed. Any of the wear or dust or grit that may find its way into the boxing will not be taken up as is usually the case where a packing is employed, but will settle to the bottom of the lower section, and may be removed from time to time.

It is evident that there may be many variations and modifications in the construction and arrangement of the different parts of my invention, without departing from the spirit thereof, and I do not limit myself to the precise form of construction or arrangement of its different parts.

Having thus described my invention and its mode of operation, what I claim, and desire to secure by Letters Patent of the United States, is as follows:

1. The combination of a car axle each end of which is provided with an enlarged projection or collar for a journal, with a boxing constructed of two sections; said boxing provided with a permanent bridge M whereby a chamber is formed between said bridge and the opposite wall of said boxing, capable of receiving a wedge block 21 and a bearing block or brass 20; said boxing also provided with an adjustable bridge N; a bolt K. held in bearings in the permanent bridge M. and the movable bridge N; means for adjusting the bridge N. and the bolt K. laterally in said boxing; the lower section of said boxing extending sufficiently below the journal B. and the bolt K. to retain and carry lubricating material; and means for holding said upper and lower sections firmly and rigidly together, all substantially as shown.

2. The combination of a car axle each end of which is provided with an enlarged projection or collar for a journal, with a boxing constructed of two sections, said boxing provided with a permanent bridge M. whereby a chamber is formed between said bridge and the opposite wall of said boxing capable of receiving a wedge block 21 and the bearing block or brass 20; said boxing also provided with an adjustable bridge N; screw threaded rods 33, and 34 passing through the front wall of said boxing and through said bridges, said rods being provided with the nuts 35, 36, 37 and 38; the wedge block 21 and the bearing block or brass 20; a bolt K. provided with an enlarged projection or collar K' held in bearings in the permanent bridge M. and the movable bridge N; the lower section of said boxing extending sufficiently below the journal B. and the bolt K. to retain and carry lubricating material; and means for holding said upper and lower sections firmly and rigidly together, all substantially as shown.

3. The combination of a car axle each end of which is provided with an enlarged projection or collar for a journal, with a boxing constructed of two sections, said boxing provided with a permanent bridge M. having a space O. as described; a wedge block 21 and the bearing block or brass 20; said boxing also provided with an adjustable bridge N. containing a takeup or bearing; guides 24 and 25 holding said adjustable bridge in place; a bolt K. held in bearings in the permanent bridge M. and the adjustable bridge N.; means for adjusting the bridge N. and the bolt K. laterally; the lower section of said boxing extending sufficiently below the journal B. and the bolt K. to retain and carry lubricating material; and means for holding said upper and lower sections firmly and rigidly together, all substantially as shown.

4. The combination of a car axle each end of which is provided with an enlarged projection or collar for a journal, with a boxing constructed of two sections; the upper section of said boxing being provided with a permanent bridge M. having an opening O; said boxing also provided with an adjustable bridge N. containing a takeup or bearing supported by guides 24 and 25 located respectively upon the opposite walls of the two sections of said boxing; a bolt K. held in bearings in the permanent bridge M. and the movable bridge N. and means for adjusting the bridge N. and the bolt K. laterally and holding them permanently in place; a screw threaded bolt 22 engaging in a slot in the block 21; the lower section of said boxing extending sufficiently below the journal B. and the bolt K. to retain and carry lubricating material; and means for holding said upper and lower sections firmly and rigidly together, all substantially as shown.

5. As an article of manufacture an axle each end of which is provided with an enlarged projection or collar for a journal, and having a section C. slightly beveled as shown; the section A of said axle which carries the car wheels being larger in diameter than the journal B and the journal B. being provided with an extension 27, all substantially as shown.

6. A boxing for car wheels constructed in two sections; the upper section being provided with a permanent bridge or partition M. made integral therewith, and having therein an opening or bearing capable of receiving and carrying a bolt K; the upper and lower sections being provided with guides 24 and 25 located on the interior walls thereof, and also being provided with the adjustable bridge N. having a takeup or bearing to receive and carry the rear end of the bolt K; the bolt K. supported in bearings in the permanent bridge M. and the adjustable bridge N; means for adjusting the bridge N. and the bolt K. laterally and holding them permanently in any given place; the lower section of said boxing extending sufficiently below the bearing B. and the bolt K. to retain and carry the lubricating material; and means for holding said upper and lower sections firmly and rigidly together, all substantially as shown.

7. A boxing for car axles constructed in two sections respectively provided with a tongue and groove and adapted to fit each other; said boxing provided with a permanent bridge M. having an opening or bearing therein; said boxing also being provided with an adjustable bridge N. having a takeup or bearing therein and supported and guided by guides 24 and 25 located upon the interior opposite walls of said boxing, the bolt K. supported in bearings in said bridges M. and N; means for adjusting bridge N. and bolt K. laterally and holding them permanently in any given place; a door H. containing an opening (h) for the introduction of lubricating material; the lower section of said boxing extending sufficiently below the two bridges M. and N. to retain and carry lubricating material below the bore through which the axle of the car passes out of the boxing, all substantially as shown.

8. The combination of a car axle each end of which is provided with an enlarged projection or collar for a journal, with a boxing constructed of two sections, respectively provided with a tongue and groove and adapted to fit each other and each provided with slots for the reception of packing; the packing 30 and 31 held in said slots and capable of closely fitting the extension of the car axle; the block 21 provided with the slot 23, a screw threaded bolt 22 engaging with said slot, the bearing or brass 20, the permanent bridge M. and the adjustable bridge N; the bolt K. supported in bearings in the said bridges; means for adjusting said bridge N. and bolt K. laterally and holding them in any desired place; the door H; the lower section of said boxing extending sufficiently below the lower wall of the bore of said boxing to retain and carry lubricating material; and means for holding said upper and lower sections firmly and rigidly together, all substantially as shown.

9. A boxing for car axles constructed in two sections adapted to fit each other and provided with a permanent bridge M. and an adjustable bridge N; a bolt K. supported in bearings in the said bridges and means for adjusting said bridge N. and said bolt K. and holding them permanently in any given place; a door H. pivoted to the upper section of said boxing at 29 and provided with an opening O. and a cap (h) held pivotally to said door, the extension of said cap locking with the catch (i) and capable of being lifted and moved so as to uncover said opening O., all substantially as shown.

ISBON METZGER.

Witnesses:
J. M. LINDLY,
C. L. METZGER.